Feb. 2, 1943.  W. F. COLLINS  2,309,886
ELECTRODE HOLDER
Filed April 8, 1942

INVENTOR
Wilbur F. Collins
BY Philip A. Friedell
ATTORNEY.

Patented Feb. 2, 1943

2,309,886

UNITED STATES PATENT OFFICE 2,309,886

ELECTRODE HOLDER

Wilbur F. Collins, Oakland, Calif.

Application April 8, 1942, Serial No. 438,197

1 Claim. (Cl. 219—8)

This invention, an electrode holder, is used for holding and coincidently delivering an electric current to welding rods during welding operations.

Electrode holders and welding clamps in many types and styles have been patented, some of which are available through the customary channels. Some of these use a method of clamping the welding rod somewhat similar to that utilized in this invention. Some resort to a metal sleeve in which a transverse passage is formed to receive the rod together with a screw inside the sleeve to clamp the rod in the passage, while others resort to a sleeve formed of an insulating material with the current delivered to the welding rod through the screw. The metal sleeve is objectionable because the holder cannot be laid down on a conductive object without causing a short circuit, while the sleeve formed of insulating material is objectionable because it will not stand up under the rough handling which such devices receive during use. Furthermore, the spatter from the weld causes rapid deterioration of the insulation.

This invention overcomes the disadvantages and faults of other electrode holders and welding tongs or clamps. In it, the holding sleeve and the plunger and screw are both formed of a conductive metal to provide the highest conductivity to the welding rod and thus reduce the amount of heat generated; the conductive sleeve is fully protected by a covering of insulation which in turn is protected by a spatter-resistant, shockproof shield which is insulated from the conductive elements by the insulation which it protects. Therefore the electrode holder can be handled roughly without damage to either the conductive elements or to the insulation, and the holder can be thrown or placed on any conductive surface without any possibility of short-circuiting the current, and spatter from a welding operation will not accumulate on, or in any way damage or alter the protective shield.

The objects and advantages of the invention are as follows:

First; to provide an electrode holder which is suitably insulated to prevent short circuits through conductive elements on which it might be placed or thrown.

Second; to provide an electrode holder as outlined in which the insulation for the conductive members is protected against damage by a shockproof shield which in turn is insulated from the conductive members by the insulation which it protects.

Third; to provide an electrode holder as outlined in which the shock-proof shield is formed of a spatter-resistant metal so that the shield will not become coated with, or be in any way damaged by the spatter of hot metal from the welding operation.

Fourth; to provide an electrode holder of the type outlined which is simple in construction, adjustable for various diameters of rods, easily and conveniently operated, economical to manufacture, and which will have comparatively long life due to the complete protection against short circuits, spatter, and rough handling.

Other objects and advantages of the invention will become apparent as the following description is read on the drawing forming a part of this specification, and in which.

Figure 1:
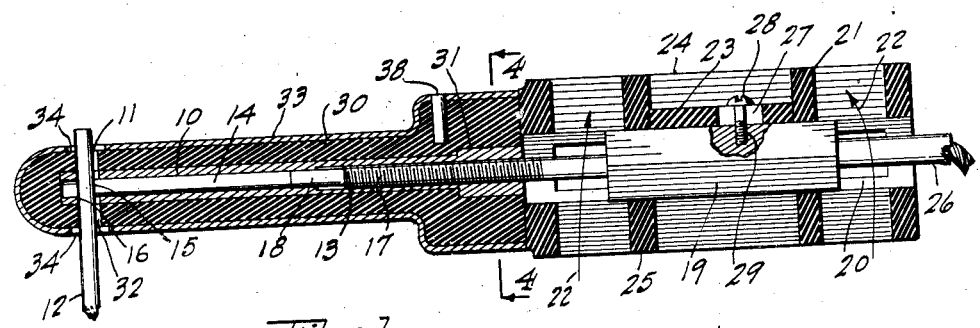
Fig. 1 is a longitudinal sectional elevation through the invention.
Figure 2:
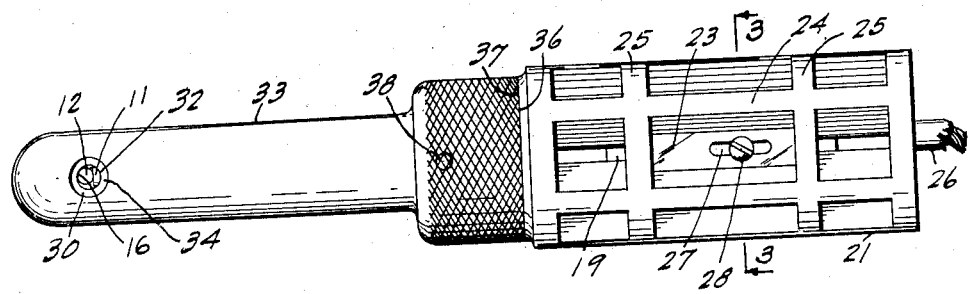
Fig. 2 is a top plan view of the invention.
Figure 3:
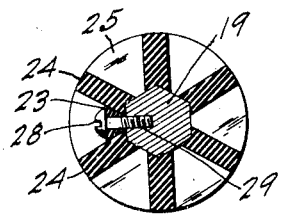
Fig. 3 is a section taken on line 3—3 of Fig. 2.
Figure 4:
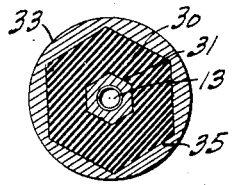
Fig. 4 is a section taken on line 4—4 of Fig. 1.

The invention includes a conductive sleeve 10 which has a transverse passage 11 formed at its outer end to receive the welding rod 12, and is internally threaded at the other end as indicated at 13. A replaceable plunger 14 slidably fits within the sleeve and is formed of a suitably conductive material, such as metal or carbon, and is adapted to be forced against the welding rod 12 as indicated at 15 to clamp the welding rod securely against the back walls 16 of the passage 11.

Suitable clamping or forcing means, such as the screw 17 which operates in the threaded portion 13 of the sleeve, is made to cooperate with the plunger 14 through the pilot 18 which is formed as a continuation of the threaded member or screw, whereby, when the screw 17 is rotated in one direction, the plunger 14 is caused to clamp the welding rod, and when rotated in the other direction, the plunger is freed to release the welding rod. This screw 17 terminates at its other end in a non-rotatable element in which is combined the terminal for the current-carrying cable. This terminal block 19 can be of any suitable shape, such as the hexagon shape shown, and is supported in a passage 20 within the handle 21 which passage is formed to the same shape and of such dimentions as to permit slidable adjustment of the terminal block 19 but not to permit rotation within the handle.

The handle 21 is formed of insulating material and is of open construction to permit efficient circulation of air through both ends of the handle as indicated by the arrows 22, and also between the hand of the operator (not shown) and the terminal block, so as to maintain the lowest possible temperature of the handle during welding operations and the highest degree of comfort to the operator.

The terminal block is retained in its adjusted position by any suitable means such as the block 23 which fits between the longitudinal fins 24, and circular fins 25 which form the handle. This adjusting block has a slot 27 through which the clamp screw 28 passes and which screw is threadedly secured in the terminal block 19 as indicated at 29. The cable 26 is suitably connected to the terminal block by known means to deliver the current to the electrode through the terminal block, screw, sleeve and plunger.

The sleeve 10 is completely encased in an insulating sock 30 as shown and is maintained against relative rotation and longitudinal displacement by any suitable means such as by the formation of a hexagon 31 at the inner end of the sleeve 10 to fit in a similarly shaped aperture formed in the insulation, the transverse passage 32 through the insulation to receive the welding rod being approximately the same size as that through the conductive sleeve 10, so that contact can be made solely through insertion of a conductive member such as a welding rod within the transverse bore of the member 10. This insulation is formed of any suitable material, preferably of a non-combustible and non-fragile material, such as asbestos saturated with a soluble silicate and heat treated, though "Alundum" and similarly refractory materials would prove highly satisfactory in view of their extreme hardness and comparative toughness and high insulating qualities.

Irrespective of the material from which the insulation is formed, it will not withstand the rough usage to which such devices are subjected, such as dropping or throwing the holder onto a concrete floor or steel plate or deck, therefore this insulating sock is protected by a completely enclosing shield 33 of a suitable material which will withstand such usage, and preferably, also be resistant to the spatter from the welding operation. Any organic material such as thermoplastics are unsuitable because they are comparatively easily damaged by the heat and spatter from a weld. A hardened steel shell would be ideally adapted so far as the shock-proof qualities are concerned but it would soon become encrusted by the spatter from welding operations. Brass, bronze and copper would be ideally suited so far as their spatter-proof qualities are concerned, but they have insufficient hardness to withstand the rough usage mentioned. They would not suitably protect the insulation. The most satisfactory material for this shield is beryl-copper, an alloy of beryllium and copper which has all of the spatter resistant qualities of copper coupled with the shock resistance of a high quality heat treated steel, so that the order of preference for this shield ranges from beryl-copper, through copper, bronze, brass and other metals and alloys, to steel, and lastly Bakelite and similar materials.

This shield has a transverse passage 34 through both walls, which is larger than the passages in the conductive sleeve and insulation, so as to fully clear the welding rod when clamped in the holder, to prevent any possibility of current transfer between the conductive sleeve and the shield. The insulation is also fixed with respect to the shield to prevent relative rotation or longitudinal displacement, such as by forming the inner end of the insulation to a hexagon shape as indicated at 35. The encompassing portion of the shield is internally formed to fit the insulation, and externally it may be of the same shape, or it may be circular and knurled as shown. This shield may be formed by any suitable method, such as drawing or forging, or even by casting.

Adjustment of the electrode holder is carried out as follows: With the screw 17 screwed at least part way into the sleeve 10, the screw 28 is eased and the handle 21 is then pulled back. The welding rod is then inserted in the clamp passage, the handle is rotated until the rod is clamped, after which the handle is forced forward to abutment of the end 36 of the holder portion with the face 37 of the handle. The screw 28 is then tightened, the handle is given additional twist to seat the surfaces 36 and 37 and clamp the welding rod tighter. The friction between the surfaces 36 and 37 maintains the relationship and prevents loosening of the clamp on the rod. So long as the same diameter of welding rods is used, no further adjustment of the terminal block in the handle is necessary, and to replace the old rod with a new one, it is merely necessary to grasp the shield and the handle and give a slight twist in the opposite direction from that previously used for tightening, which frees the rod and permits replacement with a new one, following which twisting the shield and handle back to seat 36 and 37 will clamp the new rod. When the rod is removed, the electrode holder can be dropped or thrown, or laid on any convenient surface without any danger of short circuiting or damage to the holder, and during a welding operation, spatter from the weld will not cling to or in any way injure the shield or the insulation. Suitable means, such as crimping (not shown) or a screw or pin 38 can also be used for preventing relative displacement of the parts.

I claim:

An electrode holder comprising; a metallic sleeve internally threaded at one end and having a transverse passage at the other end; an insulating sleeve cover extending throughout the length of said metallic sleeve and enclosing the other end thereof and having an abutting face at the one end and at the other end having a transverse passage of larger area than the transverse passage in said metallic sleeve and in axial registry therewith; a metal sleeve covering said insulating cover and extending throughout the length thereof and having a transverse passage of larger area than the transverse passage through said insulating cover and in axial registry therewith; a handle of insulating material having an abutting face at one end and having a hexagonal axial passage and radial webs with the intervening spaces between the webs opening into said axial passage; a hexagonal conductive member slidable in said hexagonal passage and having a threaded radial passage in one side thereof, a cable terminal at one end, and a threaded plunger member at the other end for threaded cooperation with the internally threaded end of said first-mentioned metallic sleeve; a wedge block fitting between said radial webs and having a longitudinal slot and a screw passing through said slot and engaging said threaded radial passage in said hexagonal conductive member; said hexagonal member being adjustable axially in said handle to compensate for various diameters of electrodes to coincidently clamp the electrode and abut the abutting faces of said handle and said insulating cover.

WILBUR F. COLLINS.